(12) United States Patent
Baloche (10) Patent No.: US 6,726,281 B2
(45) Date of Patent: Apr. 27, 2004

(54) VEHICLE SEAT EQUIPPED WITH A HINGE MECHANISM

(75) Inventor: François Baloche, La Pilonniére (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 10/277,495

(22) Filed: Oct. 22, 2002

(65) Prior Publication Data

US 2003/0098599 A1 May 29, 2003

(30) Foreign Application Priority Data

Nov. 27, 2001 (FR) .............................. 01 15311

(51) Int. Cl.⁷ ................................................ B60N 2/02
(52) U.S. Cl. .................................. 297/367; 297/378.12
(58) Field of Search ............................ 297/378.12, 367

(56) References Cited

U.S. PATENT DOCUMENTS

| | | | |
|---|---|---|---|
| 4,770,464 A | | 9/1988 | Pipon et al. |
| 5,779,313 A | * | 7/1998 | Rohee ..................... 297/367 |
| 6,095,608 A | | 8/2000 | Ganot et al. |
| 6,164,723 A | * | 12/2000 | Ganot ................. 297/378.12 |
| 6,328,383 B2 | * | 12/2001 | Rohee et al. ............ 297/367 |

FOREIGN PATENT DOCUMENTS

| | | |
|---|---|---|
| DE | 44 44 407 A1 | 6/1996 |
| EP | 0 250 290 A1 | 12/1987 |
| FR | 2 766 137 A1 | 1/1999 |

\* cited by examiner

*Primary Examiner*—Laurie K. Cranmer
(74) *Attorney, Agent, or Firm*—Marshall, Gerstein & Borun LLP

(57) ABSTRACT

A vehicle seat comprising a seat back mounted to pivot on a seat proper by means of first and second hinges, each of which is made up of two pivotally-mounted cheek plates that can be locked by slugs controlled by a rotary cam so that they are caused to come to mesh in a fixed set of teeth. The cams of the two hinges are connected together via a lost motion mechanism, and the fixed set of teeth of one of the hinges has truncated teeth, each of which forms a flat.

11 Claims, 5 Drawing Sheets

VEHICLE SEAT EQUIPPED WITH A HINGE MECHANISM

FIELD OF THE INVENTION

The present invention relates to vehicle seats equipped with hinge mechanisms.

More particularly, the invention relates to a vehicle seat having first and second sides, said seat comprising a seat proper and a seat back mounted to pivot relative to the seat proper by means of a hinge mechanism, said hinge mechanism comprising first and second hinges which are disposed on respective ones of the first and second sides of the seat, and each of which comprises:

- first and second cheek plates mounted to pivot relative to each other about an axis of rotation that is common to the first and second hinges, the first cheek plates of the first and second hinges both being secured to a first element chosen from the seat proper and the seat back, while the second cheek plates of the first and second hinges are both secured to a second element chosen from the seat proper and the seat back, the second cheek plate of each hinge being permanently secured to or integral with a first set of teeth which extends over at least an arc of a circle centered on the axis of rotation;
- at least one slug provided with a second set of teeth suitable for coming into engagement with the first set of teeth, said slug being mounted to move at least radially relative to the first cheek plate between firstly a fully engaged position, in which the second set of teeth meshes fully with the first set of teeth to lock the corresponding hinge, and secondly a maximally separated position, in which the slug does not co-operate with said first set of teeth, and in which the second set of teeth is spaced apart from said first set of teeth to the maximum extent, the slug being mounted to move over a first stroke from its maximally separated position to a limit-of-engagement position in which the second set of teeth is at the limit of the first set of teeth, and said slug being mounted to move over a second stroke from its limit-of-engagement position to its fully engaged position;
- a cam mounted to turn about said axis of rotation and suitable for pushing the slug into its engaged position, the cam being mounted to move between a rest position in which said cam places said first slug in its fully engaged position, and an active position in which said cam enables the slug to be placed in its maximally separated position, and said cam being urged resiliently into its rest position in a first angular direction about the axis of rotation, the cams of the first and second hinges being mounted to move over the same angular stroke between their respective rest positions and their respective active positions; and
- a control member coupled to the cam and adapted to push the slug into its maximally separated position when the cam is in the active position, and to enable the slug to be placed in its fully engaged position when the cam is in the rest position;

the seat further comprising:
- a drive member that can be actuated by the user and that is coupled to a first cam chosen from the cams of the first and second hinges, for moving said first cam from its rest position to its active position, in a second angular direction; and
- a lost motion mechanical coupling which, with a certain amount of angular play, connects the first cam to a second cam chosen from the cams of the first and second hinges, and which is adapted to drive the second cam into its active position when the first cam is moved into its active position by the drive member, said mechanical coupling being adapted to enable the first and second cams to find themselves simultaneously in their rest positions.

BACKGROUND OF THE INVENTION

Document FR-A-2 766 137 describes an example of such a seat.

The seat described in that document is quite satisfactory but does however suffer from the drawback that, because of the tolerances for assembling the structure of the seat, combined with the tolerances for assembling the seat to the floor of the vehicle, and also combined with a small amount of angular play in the first and second hinges, the teeth on the slugs can find themselves in angular positions that differ from one hinge to the other relative to the teeth of the corresponding first set of teeth.

In some cases, that can give rise to the two hinges being prevented from re-locking fully after they have been unlocked, in particular when the angular offset between the teeth on the slugs and the teeth in the first set of teeth is in a first direction in the first hinge and in an opposite second direction in the second hinge. In which case, the two hinges are latched only improperly after re-locking, so that the back of the seat offers only relatively weak resistance to torque that can be exerted on it about its axis of rotation.

Even if they are rare, such situations are dangerous for the user of the seat, particularly (but not exclusively) when the back of the seat carries a seat belt.

OBJECTS AND SUMMARY OF THE INVENTION

An object of the present invention is to mitigate that drawback.

To this end, in the invention, in a seat of the type in question, the second hinge is shaped so that the second set of teeth of said second hinge is in an intermediate position between its limit-of-engagement position and its maximally separated position when the second set of teeth of the first hinge is in its limit-of-engagement position.

By means of these provisions, it is possible for the first set of teeth of the first strength member to engage properly in the corresponding second set of teeth before the first set of teeth of the second strength member starts engaging in the corresponding second set of teeth, which makes it possible to avoid situations in which the first sets of teeth of the two strength members are offset angularly in opposite directions relative to the corresponding second sets of teeth. In addition, even when the second set of teeth of the first strength member remains offset relative to the corresponding first set of teeth, thereby preventing the slug of the second strength member from reaching its fully engaged position, the lost motion coupling nevertheless makes it possible for the slug on the first strength member to reach its fully engaged position.

In all cases, it is therefore certain that at least the first hinge is properly locked when the user releases the actuating member.

In preferred embodiments of the invention, any of the following provisions may optionally be used:

the second hinge is shaped so that the second set of teeth of the first hinge travels over at least one half of its second stroke when the actuating member is moved in a first angular direction far enough for the second set of teeth of the second hinge to go from said intermediate position to its limit-of-engagement position;

at least one of the first and second sets of teeth of the second hinge is constituted by truncated teeth, each of which has a free end forming a flat;

one only of the first and second sets of teeth of the second hinge is constituted by truncated teeth, each of which has a free end forming a flat, the other one of said first and second sets of teeth of the second hinge being constituted by teeth each of which has a free end that is rounded;

the flats formed by the free ends of the truncated teeth are all defined by the same circularly cylindrical surface centered on the axis of rotation;

the set of teeth that has the truncated teeth is the second set of teeth of the second strength member;

the seat is provided with a seat belt connected to the seat back in the vicinity of the first side of the seat;

the first hinge is stronger than the second hinge;

the first hinge is of diameter larger than the second hinge;

the control member of each hinge is a control mask provided with at least one cam edge that comes into abutment against a stud provided on the slug so as to push said slug into its retracted position when the cam of said hinge is in the active position; and the first cam is the cam of the first hinge, and the second cam is the cam of the second hinge.

BRIEF DESCRIPTION OF THE DRAWINGS

Other characteristics and advantages of the invention appear from the following description of an embodiment of it, given by way of non-limiting example, and with reference to the accompanying drawings.

In the drawings.

MORE DETAILED DESCRIPTION

In the various figures, like references designate identical or similar elements.

Figure 1:
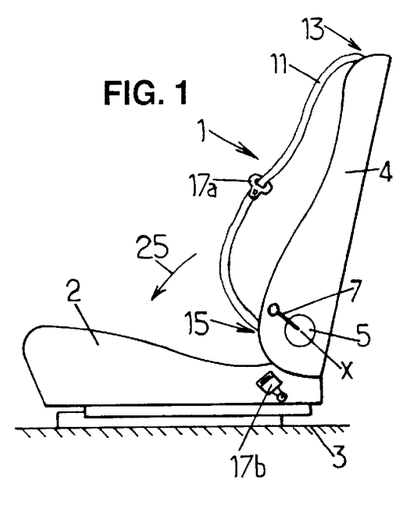
FIGS. 1 and 2 are respectively a side view and a back view of a vehicle seat in an embodiment of the invention.
Figure 2:
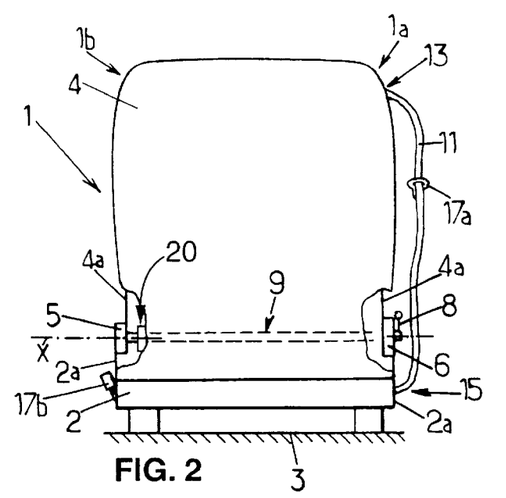

As shown diagrammatically in FIGS. 1 and 2, the invention relates to a vehicle seat 1, in particular a front seat of a motor vehicle. The seat comprises a seat proper 2 mounted on the floor 3 of the vehicle, and a seat back 4 mounted to pivot on the seat proper 2 about a transverse horizontal axis X.

More precisely, the rigid strength member 4*a* of the seat back is connected to the rigid strength member 2*a* of the seat proper via first and second hinges 6, 5 which are situated on respective ones of the first and second sides 1*a*, 1*b* of the seat, and which are controlled by a handle 8 situated on the first side 1*a* of the seat. These two hinges are connected together via a coupling 9 extending horizontally and transversely relative to the seat.

In addition, in the example considered herein, the seat 1 is further provided with a seat belt 11 that is connected to the top portion of the seat back 4, and to the seat proper 2 at respective coupling points, namely a top coupling point 13 and a bottom coupling point 15, on the first side 1*a* of the seat. The seat belt 11 conventionally has a belt buckle 17*a* which is adapted to fasten removably in a latch 17*b* which is fixed, for example to the seat proper on the second side 1*b* of the seat.

It should be noted that the above-mentioned top coupling point 13 may, for example, be constituted by a guide at which the belt 11 penetrates into the back of the seat, said belt being directed from said guide to a belt reel situated inside the seat, optionally in a position distant from the top coupling point 13.

Figure 3:
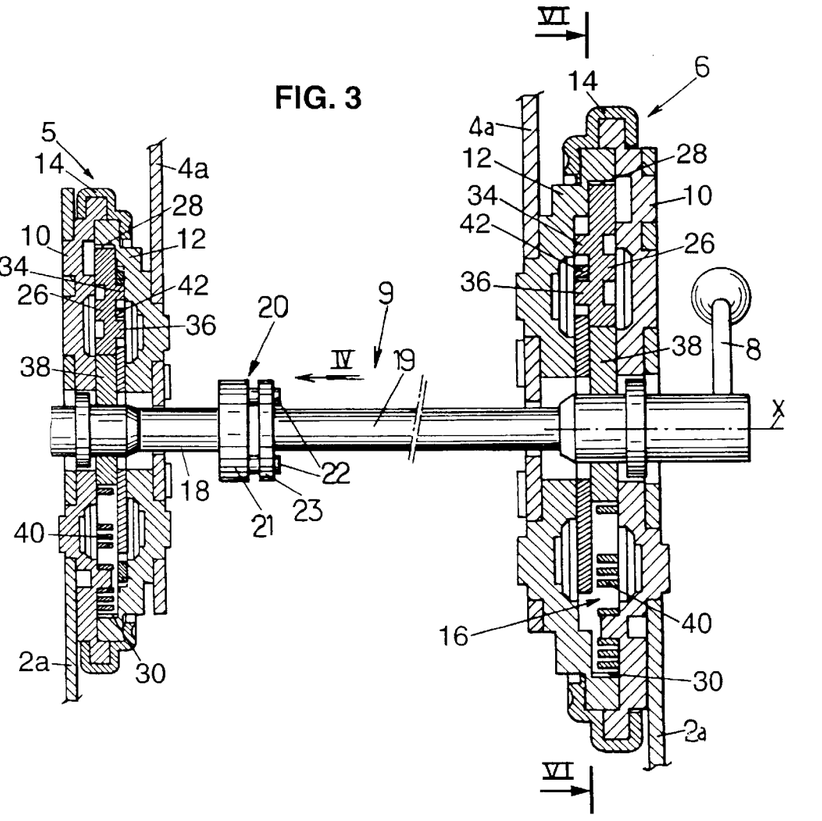
FIG. 3 is a vertical section view showing the two hinges that connect the seat back to the seat proper of the seat shown in FIGS. 1 and 2.

As shown in more detail in FIG. 3, the first hinge 6 comprises:

a fixed metal cheek plate 10 that is secured to the rigid strength member 2*a* of the seat proper;

a moving metal cheek plate 12 which is secured to the strength member 4*a* of the seat back;

a metal ring 14 which is crimped onto the peripheries of the fixed and moving cheek plates to define therewith a closed circular housing; and a locking device 16 provided with slugs and contained in the corresponding housing, which device is adapted to prevent the moving cheek plate from moving relative to the corresponding fixed cheek plate so long as the handle 8 is not actuated.

In addition, the coupling 9 that connects the two hinges 5, 6 together is advantageously constituted by two rigid bar segments 18, 19 that extend along the axis X, that are mounted to pivot about said axis X, and that are interconnected with a certain amount of angular play, via a lost-motion device 20.

Figure 4:
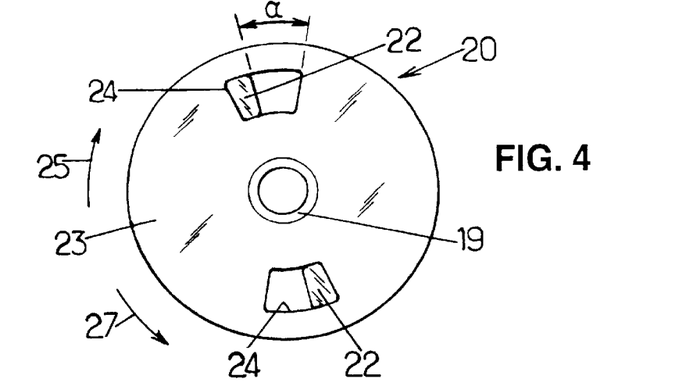
FIG. 4 is a detail view looking in the direction IV of FIG. 3.

In the example, the device 20, which is clearly visible in FIGS. 3 and 4, comprises:

firstly a radially-extending plate 21, which is secured to the bar segment 18 connected to the second hinge 5, and which is extended axially towards the bar segment 19 by two eccentric drive fingers 22; and secondly a radially-extending plate 23 which is secured to the bar segment 19 connected to the first hinge 6, and to the handle 8, and which is provided with two circularly arcuate oblong slots 24 into which the drive fingers 22 are engaged.

When the two hinges 5, 6 are in the rest position, the drive fingers 22 are in abutment against first ends of the oblong slots 24 so that:

when the handle 8 is actuated in the angular direction 25, the drive fingers 22 are immediately driven by the plate 23; and if the bar segment 18 is prevented from moving while the handle 8 is not in the rest position, said handle 8 can continue to move with the bar segment 19 in the angular direction 27 over a certain angular stroke α before the second ends of the oblong slots 24 come into abutment against the drive fingers 22.

By way of example, the stroke α may be approximately in the range 5° to 10°.

Figure 5:
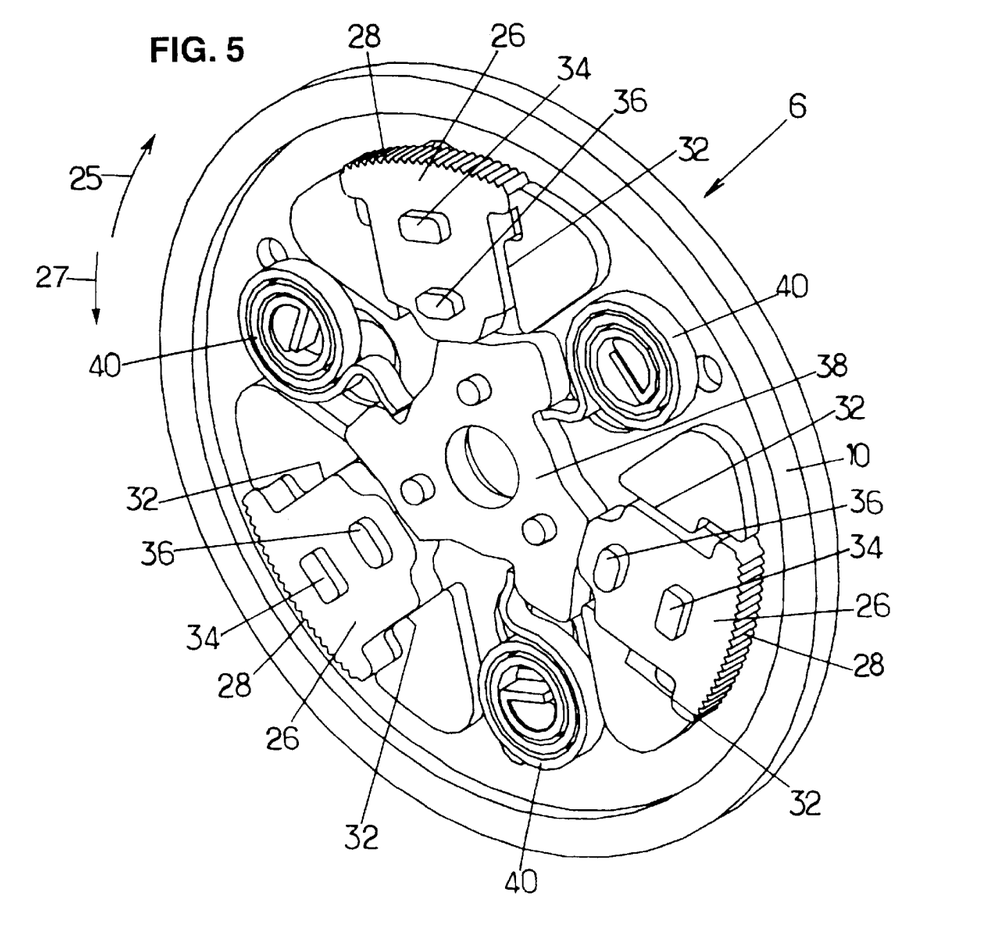
FIG. 5 is a perspective view showing a portion of the first hinge that connects the seat back to the seat proper in the seat of FIGS. 1 to 3.
Figure 6:
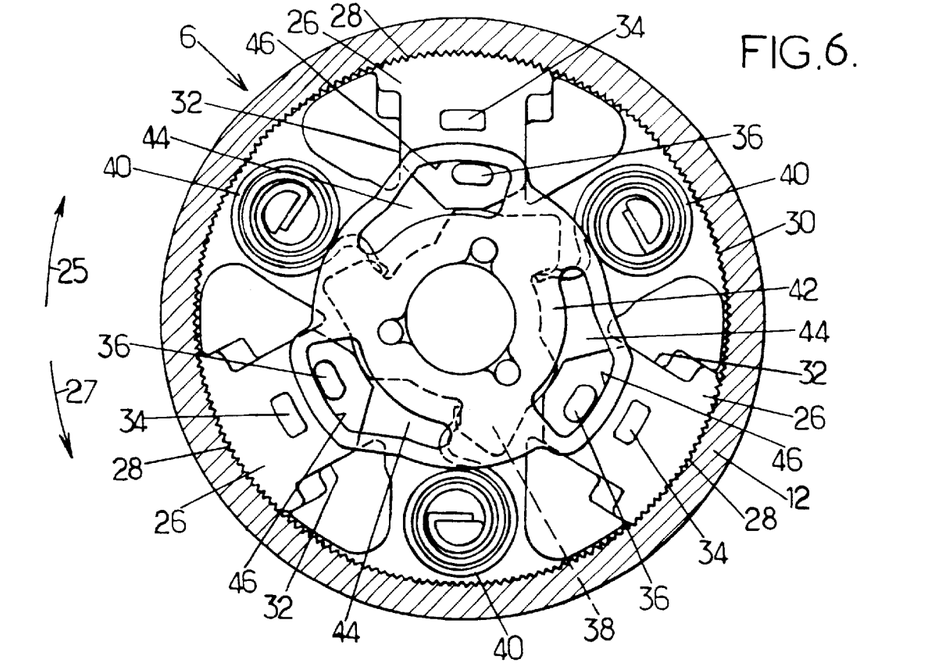
FIG. 6 is a section view on line VI—VI of FIG. 3, showing the first hinge in its rest position.

As shown in FIGS. 5 and 6, and in the example in question, the first hinge 6 comprises:

three metal locking slugs 26 which are disposed at 120° intervals, and each of which is provided with an outwardly-directed set of teeth 28 adapted to come into engagement with a circular inwardly-directed set of teeth 30 centered on the axis X and provided in the moving cheek plate 12; each of the slugs is mounted to slide radially in a respective guide 32 which is secured to the fixed cheek plate 10, so that the slugs can be moved between firstly a fully engaged position in which the teeth on the slugs are engaged with the teeth on the corresponding moving cheek plate to lock the hinge, and secondly a maximally separated position in which the slugs do not co-operate with the set of teeth on the moving cheek plate, and in which the slugs are spaced apart to the maximum extent from said set of teeth 30; each slug is further provided with two studs 34, 36 that project axially towards the moving cheek plate;

a metal cam 38 which is secured to the handle 8 and to the bar segment 19 and which controls the sliding of the slugs 26;

springs 40 which are mounted on the fixed cheek plate and which urge the cam 38 in the angular direction 27 towards a rest position in which said cam places the slugs in their active engaged position, it being possible for said cam to pivot in the angular direction 25 into an active position enabling the slugs to slide to their maximally separated position, thereby unlocking the corresponding hinge; and a control mask formed by a rigid metal plate 42 that is connected rigidly to the cam 38 and that extends radially between said cam and the moving cheek plate while overlapping the slugs in part, said plate being provided with three cutouts 44 in which the studs 36, 37 of the slugs are engaged, each of the studs co-operating with a respective cam edge 46 that defines the radially outer side of the corresponding cutout, and that is shaped to co-operate with the corresponding stud so as to move the corresponding slug radially inwards when the cam 38 turns in the angular direction 25.

Figure 7:
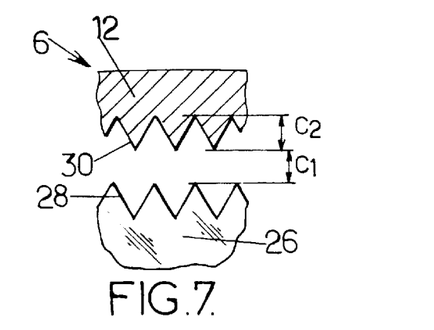
FIGS. 7 and 8 are detail views showing the set of teeth of a slug of the first hinge respectively in the maximally separated position and in the limit-of-engagement position.
Figure 8:
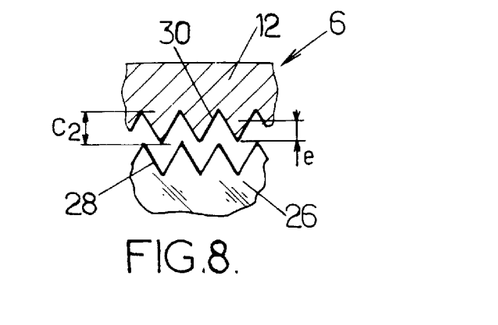

As shown in FIGS. 7 and 8, each slug 26 of the hinge 6 can be moved radially over a first stroke c1 from its maximally separated position (FIG. 7) to a limit-of-engagement position (FIG. 8), in which the teeth on the slugs 26 are at the limit of being engaged in the teeth 30 on the moving cheek plate 12.

From this limit-of-engagement position, the slugs 26 of the first hinge 6 can be moved further radially outwards over a second stroke c2 to the above-mentioned fully engaged position.

The second hinge 5 is similar to the first hinge 6 and is therefore not described in detail below.

Said second hinge 5 differs from the first hinge 6 in the following aspects:

its cam 38 is secured to the bar segment 18 instead of being secured to the bar segment 19; and the second hinge 5, which is situated on that side of the seat which is not provided with the top coupling point 13 for the seat belt, is not as strong as the first hinge 6 in the example in question: in particular, said second hinge 5 may have an outside diameter (e.g. about 80 millimeters (mm)) that is smaller than the outside diameter of the first hinge 6 (e.g. about 110 mm).

Figure 9:
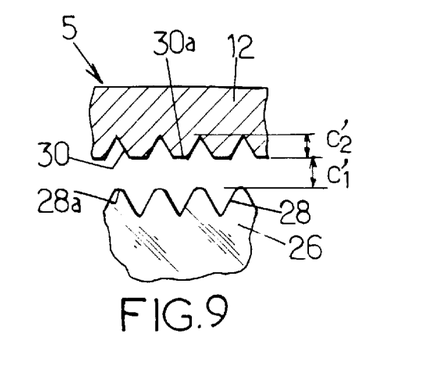
FIGS. 9 and 10 are detail views showing a slug of the second hinge, when the slugs of the first hinge are respectively in the position shown in FIG. 7 and in the position shown in FIG. 8.

In addition, as shown in FIG. 9, the teeth making up the set of teeth 30 on the moving cheek plate 12 of the second hinge are truncated, and each of them is provided with a free end forming a flat 30a, the various flats 30a on the teeth 30 all being defined by the same circularly cylindrical surface centered on the axis of rotation X.

Advantageously, the free ends 28a of the teeth 28 on the slugs 26 in the second hinge may additionally be rounded.

By means of these provisions, and in particular by means of the presence of the flats 30a at the free ends of the teeth of the set of teeth 30, the slugs 26 in the second hinge 5 can be moved over a relatively longer stroke c'1 from their maximally separated position to their limit-of-engagement position, and then over a shorter stroke c'2 from their limit-of-engagement position to their fully engaged position.

Figure 10:
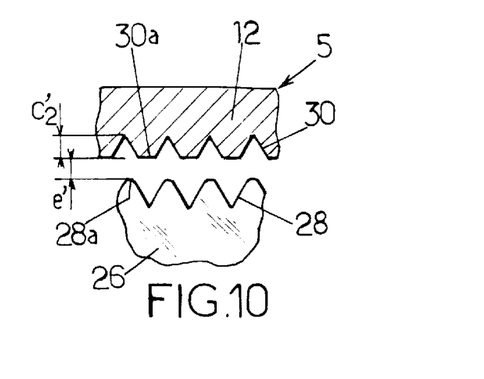

Thus, as shown in FIG. 10, when the handle 8 is moved in the angular direction 27 so that the cams 38 of the two hinges are moved towards their rest positions, the slugs 26 in the second hinge 5 find themselves in an intermediate position between their maximally separated position and their limit-of-engagement position, whereas the slugs 26 in the first hinge 6 are already in the limit-of-engagement position.

As shown in FIG. 10, from this position, the slugs 26 still have to travel over a stroke e' before they reach their limit-of-engagement position.

As shown in FIG. 8, while the slugs 26 of the first hinge 5 travel over said stroke e', the slugs 26 of the first hinge travel a stroke e (equal to or longer than the stroke e', depending on whether the cams 38 and the back portions of the slugs 26 are identical or different from one hinge to the other). The stroke e may, for example, represent at least one half of the above-mentioned engagement stroke c2, or preferably at least two-thirds of said engagement stroke c2.

It is thus guaranteed that the slugs 26 of the first hinge are well engaged in the corresponding set of teeth 30 before the slugs 26 of the second hinge 5 reach the limit of the corresponding set of teeth 30.

It is thus possible to avoid a situation in which the teeth 28 of the slugs of the two hinges are offset angularly in two different directions relative to the corresponding sets of teeth 30, which can lead to poor locking of the two hinges. On the contrary, since the above-mentioned critical situation is avoided, it is guaranteed that the handle 8 and the cam 38 of the first strength member 6 always return to their rest positions, even if the cam 38 of the second hinge 5 remains blocked in an intermediate position without being able to move the corresponding slugs 26 into their fully engaged position: in which case, the above-mentioned device 20 makes it possible to decouple the two cams 38.

The above-described seat operates as follows.

When the passenger in the seat 1 wishes to adjust the inclination of the back 4, said user actuates the handle 8 by turning it in the angular direction 25, thereby simultaneously driving the cams 38 of both hinges into their retracted positions, so that the slugs 26 in both hinges move radially inwards to their maximally separated positions.

The passenger in the seat can then adjust the inclination of the back 4 by acting directly on said back, e.g. by leaning backwards so that the back of the user pushes the seat back backwards, or by allowing it to move forwards under drive from one or more springs (not shown) inside the seat back.

Once the user has adjusted the inclination of the seat and has released the handle 8, the cams 38 of the two hinges move in the angular direction 27 into their rest positions under drive from the springs 40, so that the slugs 26 in both hinges slide radially outwards towards the corresponding sets of teeth 30.

Figure 11:
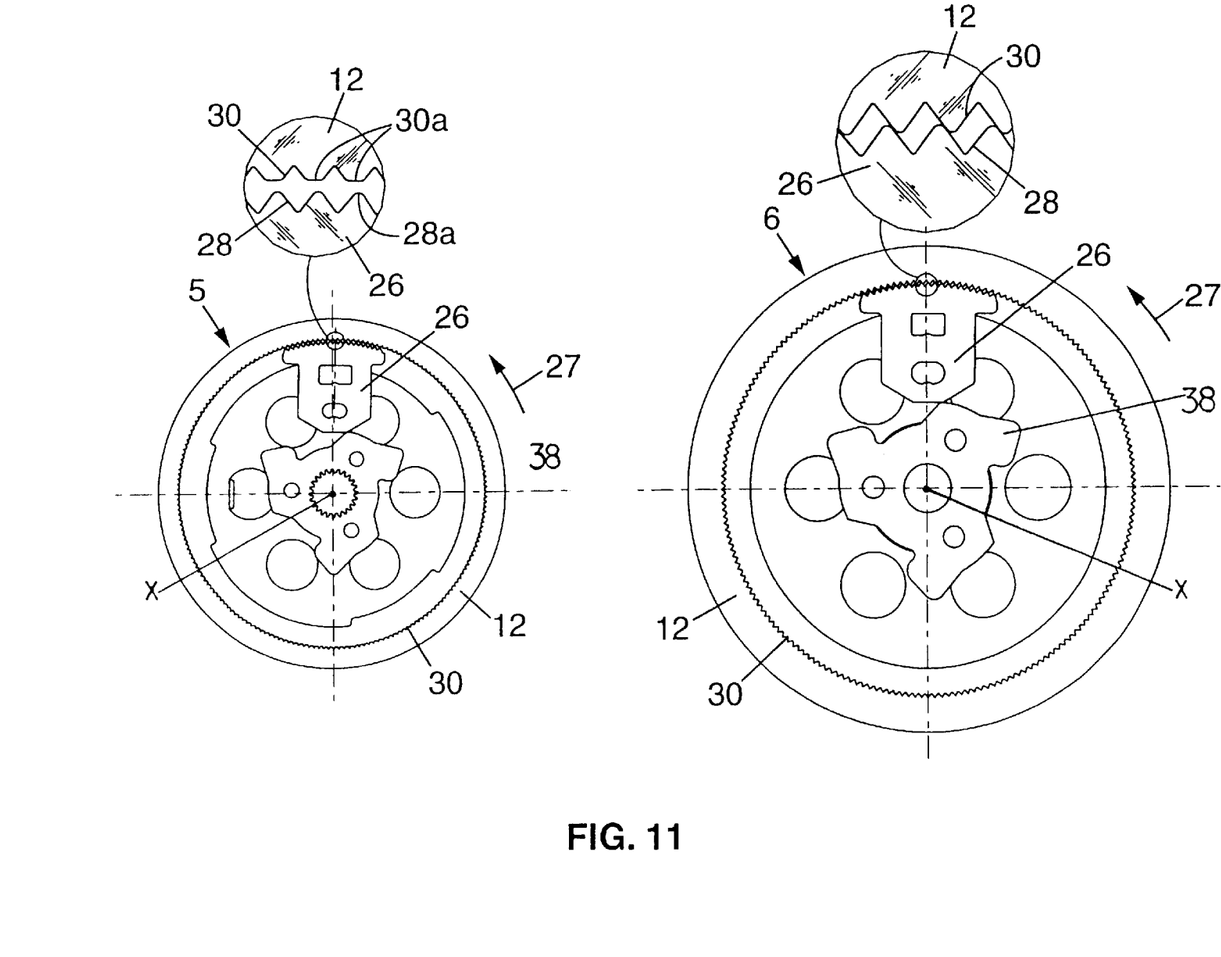
FIGS. 11 and 12 are fragmentary views showing two hinges of the seat, respectively at the start of locking and at the end of locking, after unlocking has taken place.

During this movement, if the sets of teeth 28 on the slugs are not aligned with the corresponding sets of teeth 30, and even if such an alignment error is different from one hinge to the other, as shown in FIG. 11, the teeth 28 on the slugs in the first hinge 6 nevertheless engage in the corresponding set of teeth 30, over the above-mentioned stroke e.

Figure 12:
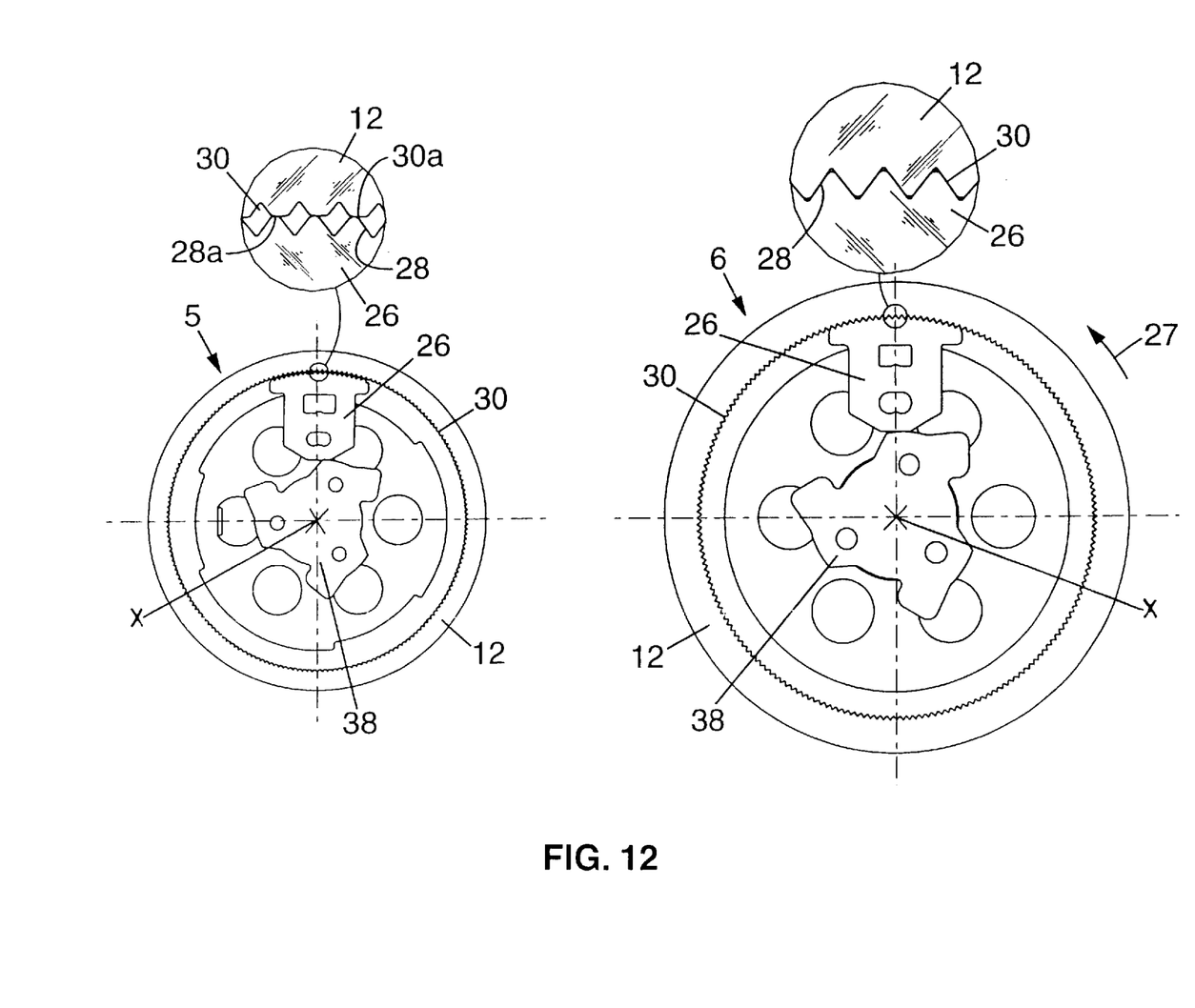

Once said stroke e has been travelled by the slugs 26 of the first hinge 6, it is possible that the ends 28a of the teeth on the slugs 26 of the second hinge 5 might be disposed facing flats 30a on the corresponding set of teeth 30, as shown in FIG. 12. In which case, the slugs 26 of the second hinge 5 do not come into engagement with the corresponding set of teeth 30, and the cam 38 of the second hinge 5 remains blocked in an intermediate position between its active position and its rest position.

In any event, by means of the presence of the lost-motion device 20, the cam 38 of the first hinge 6 can continue to turn in the angular direction 27 about the axis X, under the effect of the above-mentioned springs 40, so that the slugs 26 of the first hinge 6 reach their fully engaged position, as shown in FIG. 12.

In this position, the safety of the user of the seat is already guaranteed.

In addition, when the user of the seat leans against the seat back 4 starting from the position shown in FIG. 12, said back is subjected to elastic deformation that is relatively small but that is sufficient to offset the sets of teeth 28, 30 of the second hinge 5 angularly, thereby enabling the slugs 26 of said second hinge to come into the fully engaged position, so that the second hinge is in turn locked.

It should be noted that the above-described results could, in particular, optionally be obtained:

by providing flats at the ends of the teeth on the slugs 26 of the second hinge 5, rather than at the ends of the teeth of the set of teeth 30; or by shaping the cam 38 of the second hinge 5 so that the slugs 26 of said second hinge 5 still have said stroke e' to travel when the slugs 26 of the first hinge 6 reach the limit-of-engagement position (the solutions using flats at the ends of the teeth 28 and/or 30 are however preferred).

It should also be noted that the lost motion mechanism 20 could be replaced with any other lost-motion coupling producing the same effect, e.g. provided between the cam 38 of the second hinge 5 and the coupling bar 9 which could then be in one piece.

Finally, it should be noted that, it is optionally possible to fix the handle 8 to the bar segment 18 on the second side 1b of the seat, even though this solution is not preferred. In which case, the lost angular stroke α should be restricted to the minimum possible, e.g. to about 5°.

What is claimed is:

1. A vehicle seat having first and second sides, said seat comprising a seat proper and a seat back mounted to pivot relative to the seat proper by means of a hinge mechanism, said hinge mechanism comprising first and second hinges which are disposed on respective ones of the first and second sides of the seat, and each of which comprises:

first and second cheek plates mounted to pivot relative to each other about an axis of rotation that is common to the first and second hinges, the first cheek plates of the first and second hinges both being secured to a first element chosen from the seat proper and the seat back, while the second cheek plates of the first and second hinges are both secured to a second element chosen from the seat proper and the seat back, the second cheek plate of each hinge being permanently secured to or integral with a first set of teeth which extends over at least an arc of a circle centered on the axis of rotation;

at least one slug provided with a second set of teeth suitable for coming into engagement with the first set of teeth, said slug being mounted to move at least radially relative to the first cheek plate between firstly a fully engaged position, in which the second set of teeth meshes fully with the first set of teeth to lock the corresponding hinge, and secondly a maximally separated position, in which the slug does not co-operate with said first set of teeth, and in which the second set of teeth is spaced apart from said first set of teeth to the maximum extent, the slug being mounted to move over a first stroke from its maximally separated position to a limit-of-engagement position in which the second set of teeth is at the limit of the first set of teeth, and said slug being mounted to move over a second stroke from its limit-of-engagement position to its fully engaged position;

a cam mounted to turn about said axis of rotation and suitable for pushing the slug into its engaged position, the cam being mounted to move between a rest position in which said cam places said first slug in its fully engaged position, and an active position in which said cam enables the slug to be placed in its maximally separated position, and said cam being urged resiliently into its rest position in a first angular direction about the axis of rotation, the cams of the first and second hinges being mounted to move over the same angular stroke between their respective rest positions and their respective active positions; and a control member coupled to the cam and adapted to push the slug into its maximally separated position when the cam is in the active position, and to enable the slug to be placed in its fully engaged position when the cam is in the rest position;

the seat further comprising:

a drive member that can be actuated by the user and that is coupled to a first cam chosen from the cams of the first and second hinges, for moving said first cam from its rest position to its active position, in a second angular direction; and a lost motion mechanical coupling which, with a certain amount of angular play, connects the first cam to a second cam chosen from the cams of the first and second hinges, and which is adapted to drive the second cam into its active position when the first cam is moved into its active position by the drive member, said mechanical coupling being adapted to enable the first and second cams to find themselves simultaneously in their rest positions;

wherein the second hinge is shaped so that the second set of teeth of said second hinge is in an intermediate position between its limit-of-engagement position and its maximally separated position when the second set of teeth of the first hinge is in its limit-of-engagement position.

2. A seat according to claim 1, in which the second hinge is shaped so that the second set of teeth of the first hinge travels over at least one half of its second stroke when the actuating member is moved in a first angular direction far enough for the second set of teeth of the second hinge to go from said intermediate position to its limit-of-engagement position.

3. A seat according to claim 1, in which at least one of the first and second sets of teeth of the second hinge is constituted by truncated teeth, each of which has a free end forming a flat.

4. A seat according to claim 3, in which one only of the first and second sets of teeth of the second hinge is constituted by truncated teeth, each of which has a free end forming a flat, the other one of said first and second sets of teeth of the second hinge being constituted by teeth each of which has a free end that is rounded.

5. A seat according to claim 3, in which the flats formed by the free ends of the truncated teeth are all defined by the same circularly cylindrical surface centered on the axis of rotation.

6. A seat according to claim 3, in which the set of teeth that has the truncated teeth is the second set of teeth of the second strength member.

7. A seat according to claim 1, provided with a seat belt connected to the seat back in the vicinity of the first side of the seat.

8. A seat according to claim 1, in which the first hinge is stronger than the second hinge.

9. A seat according to claim 8, in which the first and second hinges are circular, and the first hinge is of diameter larger than the second hinge.

10. A seat according to claim 1, in which the control member of each hinge is a control mask provided with at least one cam edge that comes into abutment against a stud provided on the slug so as to push said slug into its retracted position when the cam of said hinge is in the active position.

11. A seat according to claim 1, in which the first cam is the cam of the first hinge, and the second cam is the cam of the second hinge.

* * * * *

UNITED STATES PATENT AND TRADEMARK OFFICE
CERTIFICATE OF CORRECTION

PATENT NO. : 6,726,281 B2  Page 1 of 1
DATED : April 27, 2004
INVENTOR(S) : Francois Baloche It is certified that error appears in the above-identified patent and that said Letters Patent is hereby corrected as shown below:

<u>Title page,</u>
Item [75], Inventors, please delete "La Pilonniére" and insert -- La Carneille --.

Signed and Sealed this

Twenty-seventh Day of July, 2004

JON W. DUDAS
*Acting Director of the United States Patent and Trademark Office*